(12) United States Patent
Macke

(10) Patent No.: US 6,901,676 B1
(45) Date of Patent: Jun. 7, 2005

(54) ECCENTRIC BUSHING INSPECTION DEVICE

(75) Inventor: David Macke, Sidney, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/773,689

(22) Filed: Feb. 6, 2004

(51) Int. Cl.[7] .............................. G01B 5/00; G01B 5/08
(52) U.S. Cl. .............................. 33/550; 33/555; 33/712
(58) Field of Search ................... 33/549–551, 553–555, 33/555.1, 555.3, 1 BB, 712, 501.07, 501.09

(56) References Cited

U.S. PATENT DOCUMENTS

| | | | |
|---|---|---|---|
| 1,204,027 A | 11/1916 | Johnson | |
| 1,308,324 A | 7/1919 | Bellard | |
| 1,319,361 A | 10/1919 | Rouanet | |
| 1,625,462 A | 4/1927 | Frauenthal | |
| 1,637,482 A | 8/1927 | Graves | |
| 1,769,077 A | 7/1930 | Small | |
| 2,770,050 A | 11/1956 | Johnson | |
| 3,432,932 A | 3/1969 | Oellerich et al. | |
| 3,639,992 A | * 2/1972 | Dabrush et al. | 33/553 |
| 3,678,585 A | * 7/1972 | Dabrush et al. | 33/502 |
| 3,751,812 A | 8/1973 | Meyer | |
| 3,913,234 A | 10/1975 | Windle | |
| 3,942,253 A | 3/1976 | Gebel et al. | |
| 4,251,922 A | * 2/1981 | Perlotto | 33/548 |
| 4,485,559 A | * 12/1984 | Lorenzini | 33/542 |
| 4,750,699 A | 6/1988 | Tingley | |
| 4,977,682 A | 12/1990 | Allen, III | |
| 5,634,361 A | 6/1997 | Herschman et al. | |
| 5,870,833 A | * 2/1999 | Van Bebber et al. | 33/554 |
| 6,314,655 B1 | * 11/2001 | Quintavalla et al. | 33/555.1 |
| 6,381,861 B1 | 5/2002 | Deterling | |
| 6,578,281 B2 | * 6/2003 | Takahashi | 33/555.1 |
| 6,718,645 B2 | * 4/2004 | Berger | 33/506 |
| 2003/0079359 A1 | * 5/2003 | Richards | 33/555.1 |

* cited by examiner

Primary Examiner—Christopher W. Fulton
Assistant Examiner—Yaritza Guadalupe
(74) Attorney, Agent, or Firm—Rankin, Hill, Porter & Clark LLP; Vincent Camacco

(57) ABSTRACT

A device and method are provided for inspecting an eccentric bushing having interior and exterior surfaces. The device includes a fixed roller and a pair of movable rollers disposed in a triangular configuration. The eccentric roller is disposed between the fixable roller and the movable rollers such that the fixed roller is disposed against an interior surface of the bushing and the movable rollers are disposed against the exterior surface of the bushing. A contact element of a gauge is disposed between the movable rollers and against the exterior surface of the bushing. Rotation of the eccentric bushing moves the contact element, which causes a display of the gauge to provide readings showing changes in the distance between the interior and exterior surfaces of the bushing.

24 Claims, 2 Drawing Sheets

ECCENTRIC BUSHING INSPECTION DEVICE

BACKGROUND OF THE INVENTION

The present invention is directed toward the inspection of eccentric bushings and, more particularly, toward inspection devices and methods for checking an eccentric bushing to determine the amount and direction of the offset of the eccentric bushing.

As is well known, an eccentric bushing is a bushing having a cylindrical exterior surface and a cylindrical interior bore, wherein the axis of the interior bore is not coaxial with the axis of the cylinder defined by the exterior surface, i.e., the axis of the interior bore is offset from the axis of the exterior surface. Eccentric bushings are used in various applications, including automotive applications. In some of these applications, it is necessary to determine the amount and/or direction of the offset of the axis of the interior bore from the axis of the exterior surface. One method that has been used to make this determination utilizes a cylindrical mount and a dial test indicator, wherein the mount is held by a metal holding device, such as a vice, and the dial test indicator is mounted to the holding device using a magnetic base. The eccentric bushing is disposed over the mount and a pivotable actuator rod of the dial test indicator is disposed against an exterior surface of the bushing. The eccentric bushing is then rotated around the mount, i.e., around the axis of the interior bore. Since the axis of the exterior surface is not coaxial with the axis of the interior bore, the exterior surface will pivot the actuator rod as the eccentric bushing is rotated. This pivotal movement of the actuator rod is amplified and displayed by a gauge of the dial test indicator. Using readings from the gauge, the amount and/or direction of the offset of the axis of the interior bore can be determined.

The foregoing prior art apparatus and method for inspecting eccentric bushings has several disadvantages. If the exterior surface is not perfectly cylindrical, inaccuracies are introduced into the readings. In addition, in order to permit the eccentric bushing to be rotated, there must sufficient clearance between the eccentric bushing and the mount. This clearance, however, permits the axis of the interior bore to shift, which also introduces inaccuracies into the readings. Accordingly, it is desirable to minimize the clearance between the eccentric bushing and the mount, which requires the mount to have a diameter specifically tailored for the interior bore of the eccentric bushing. Thus, multiple mounts must be provided in order to inspect eccentric bushings having interior bores with different dimensions, and even with these multiple mounts, the clearances (and, thus, the inaccuracies) cannot be totally eliminated.

Therefore, there exists a need in the art for an improved inspection device and method for checking an eccentric bushing, wherein the inspection device and the method can be used with eccentric bushings having interior bores with different diameters and exterior surfaces that are not perfectly cylindrical. The present invention is directed to such an inspection device and method.

SUMMARY OF THE INVENTION

In accordance with the present invention, a device for inspecting an eccentric bushing having interior and exterior surfaces is provided. The device includes first, second and third holding devices, a base to which the first holding device is mounted and a carrier structure to which the second and third holding devices are mounted. The carrier structure is mounted to the base for movement relative to the base between a first position, wherein the second and third holding devices are disposed distal to the first holding device, and a second position, wherein the second and third holding devices are disposed proximate to the first holding device. A spring is disposed between the carrier structure and the base and is operable to bias the carrier structure toward the second position. A gauge is mounted to the base and includes a display and a movable contact element disposed between the second and third holding devices. The display is operatively connected to the contact element so as to provide a visual reading indicating the amount of movement of the contact element. The contact element is biased toward the first holding device. The first, second and third holding devices and the contact element are positioned to allow the eccentric bushing to be placed in an inspection position, wherein the eccentric bushing is disposed between the first holding device and the second and third holding devices, such that the first holding device is disposed against the interior surface of the eccentric bushing and such that the contact element and the second and third holding devices are disposed against the exterior surface of the eccentric bushing. When the eccentric bushing is in the inspection position, rotation of the eccentric bushing moves the contact element, which causes the display to provide readings showing changes in the distance between the interior and exterior surfaces of the eccentric bushing as the eccentric bushing is rotated.

Also provided in accordance with the present invention is a method of inspecting an eccentric bushing having interior and exterior surfaces. In accordance with the method a contact element and first, second and third rollers are provided. The first roller is held such that the first roller is rotatable around a first central axis and such that the first central axis is fixed in position. The second and third rollers are held such that the second and third rollers are rotatable around second and third central axes, respectively, and such that the second and third central axes are fixed in position relative to each other, but are movable relative to the first central axis in a direction perpendicular to the first central axis, and such that the first, second and third central axes are arranged in a triangular configuration. The contact element is held so as to be movable along a linear path extending between the second and third rollers. The eccentric bushing is placed between the first roller and the second and third rollers, such that the first roller is disposed against the interior surface of the eccentric bushing and such that the contact element and the second and third rollers are disposed against the exterior surface of the eccentric bushing. Biasing forces are applied to the contact element and the second and third rollers that urge the contact element and the second and third rollers toward the first roller. The eccentric bushing is rotated while being positioned between the first roller and the second and third rollers, which causes the contact element to move. This movement is measured to provide a measure of the changes in distance between the interior and exterior surfaces of the eccentric bushing as the eccentric bushing is rotated.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
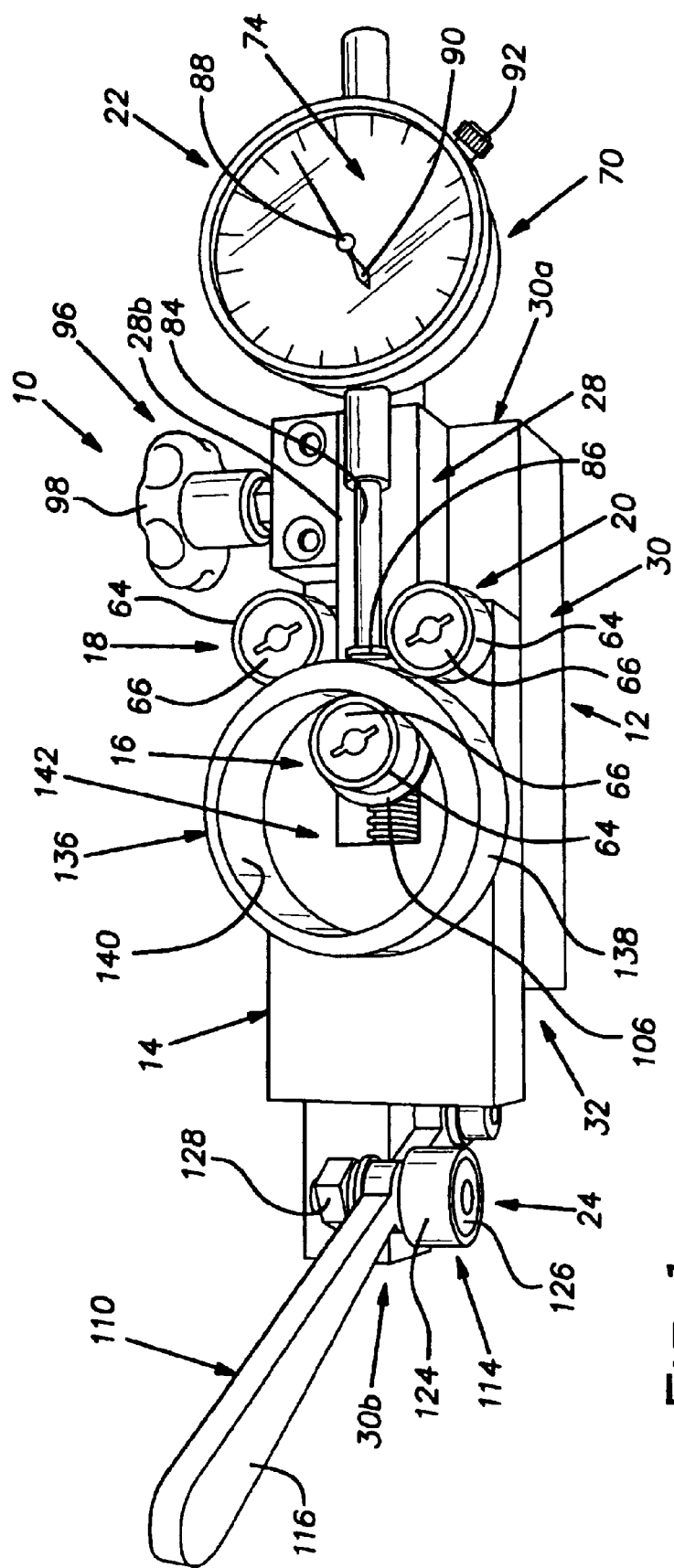
FIG. 1 is a top perspective view of an inspection device being used to check an eccentric bushing.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

As used herein, the term "eccentric bushing" shall mean a bushing having a cylindrical exterior surface and a cylindrical interior bore, wherein the axis of the interior bore is not coaxial with the axis of the cylinder defined by the exterior surface, i.e., the axis of the interior bore is offset from the axis of the exterior surface.

As used herein with regard to an eccentric bushing, the term "high point" shall mean the location on an exterior surface of the eccentric bushing, wherein the distance between the exterior surface and an interior surface of the eccentric bushing is greatest. In other words, the high point is positioned opposite the direction of the offset.

The present invention is directed to an inspection device for checking an eccentric bushing to determine the amount and direction of the offset of the eccentric bushing and, in connection therewith, to determine the "high point" of the eccentric bushing.

Figure 2:
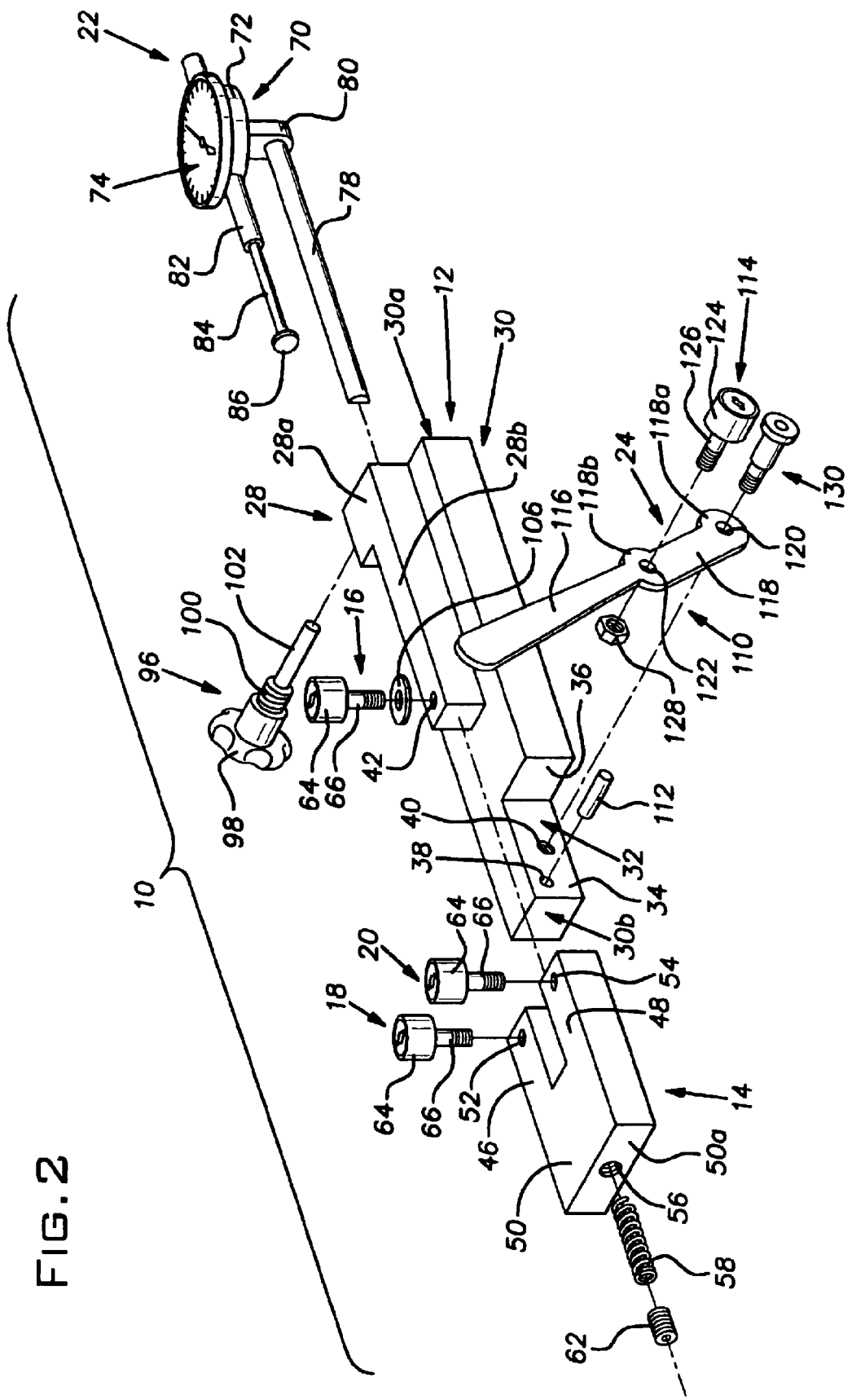
FIG. 2 is an exploded view of the inspection device.

Referring now to FIGS. 1 and 2, the inspection device 10 generally comprises a base 12, a carrier structure 14, a first holding device or roller assembly 16, a second holding device or roller assembly 18, a third holding device or roller assembly 20, a gauge 22 and a lever assembly 24. As will be discussed more fully below, the base 12 and the carrier structure 14 cooperate to form a holding structure to which the first, second and third roller assemblies 16, 18 and 20 are mounted.

The base 12 is preferably composed of a metal, such as aluminum or more preferably steel, and includes a mount 28 joined to a top surface of a support structure 30. The support structure 30 has first and second ends 30a, 30b and is substantially rectangular in shape, except for a cut-out region 32 at the second end 30b, which is defined by inward side and end surfaces 34, 36. A smooth bore 38 and a threaded bore 40 extend into the inward side surface 34. The mount 28 is L-shaped and includes a foot portion 28a joined at a right angle to an elongated body portion 28b. An end surface of the foot portion 28a extends along and is preferably aligned with the first end 30a of the support structure 30. A horizontal main bore (not shown) extends transversely through the foot portion 28a and longitudinally through a major portion of the body portion 28b of the mount 28. The main bore has an opening formed in the end surface of the foot portion 28a. A horizontal side bore (not shown) extends through the foot portion 28a and intersects the main bore at a right angle. At least an outer portion of the side bore is threaded. An opening for the side bore extends through a side surface of the foot portion 28a. A vertical first mounting bore 42 is formed in the body portion 28b of the mount 28. The first mounting bore 42 is threaded and is located proximate to a free end of the body portion 28a, which is disposed toward the second end 30b of the support structure 30.

The carrier structure 14 is also preferably composed of a metal, such as aluminum or more preferably steel. The carrier structure 14 is generally C-shaped and includes a pair of spaced-apart first and second arms 46, 48 joined together by an enlarged bridge portion 50. Vertical second and third mounting bores 52, 54 are formed in the first and second arms 46, 48, respectively. The second and third mounting bores 52, 54 are threaded and are located proximate to free ends of the first and second arms 46, 48, respectively. A horizontal spring bore 56 extends longitudinally through the bridge portion 50. The spring bore 56 extends between an inner opening in an interior end surface of the bridge portion 50, which is disposed between the first and second arms 46, 48, and an outer opening in an opposing end surface 50a of the bridge portion 50, which is disposed distal to the first and second arms 46, 48. The spring bore 56 is threaded at least toward the outer opening. A spring 58 is disposed in the spring bore 56 and includes an inner end, which extends out from the interior end surface (when the spring 58 is relaxed), and an outer end, which is disposed against a set screw 62 that is threaded into the spring bore 56 through the outer opening.

The first, second and third roller assemblies 16, 18, 20 each include a hollow cylindrical roller 64 disposed around and rotatably secured to a center axle 66. Each of the center axles 66 includes a threaded body joined to a head, which is disposed within the opening of its associated roller 64. The center axles 66 of the second and third roller assemblies 18, 20 are threadably secured within the second and third mounting bores 52, 54 of the carrier structure 14, respectively, thereby mounting the second and third roller assemblies 18, 20 to the first and second arms 46, 48, respectively. As will be discussed further below, the center axle 66 of the first roller assembly 16 is threadably secured within the first mounting bore 42 of the base 12.

The roller 64 of the first roller assembly 16 has a diameter that is larger than the distance between the rollers 64 of the mounted second and third roller assemblies 18, 20 and that is preferably larger than the distance between the first and second arms 46, 48 of the carrier structure 14. Preferably, the rollers 64 of the first, second and third roller assemblies 16–20 have the same, or substantially the same, diameters.

The gauge 22 includes a housing 70 having a cylindrical side wall 72 and a rear or bottom end wall. A graduated dial face 74 enclosed in a glass casing is secured over an open front or top end of the housing 70. The dial face 74 is provided with a graduated scale around its circumference, such as from 0 to 100 for half the circumference and 0 to −100 for the other half of the circumference. An elongated mounting rod 78 is secured to the housing 70 so as to extend in cantilever fashion therefrom. The mounting rod 78 is a half cylinder and includes a planar inner surface and an arcuate outer surface. An end of the mounting rod 78 is fixedly secured within an opening of an anchor eyelet 80 that is secured to the bottom end wall. A hollow cylindrical tube 82 passes through the side wall 72 of the housing 70 and extends parallel to the mounting rod 78. An actuator rod 84 is slidably disposed in the tube 82 and extends outwardly therefrom. A contact pad or element 86 is secured to an exterior end of the actuator rod 84. The contact element 86 preferably has a rounded contact surface. The actuator rod 84 is movable between retracted and extended positions. A spring (not shown) biases the actuator rod 84 toward the extended position. An interior end of the actuator rod 84 is connected by a linkage (not shown) to a shaft 88 that extends through the dial face 74. A pointer 90 is secured to an outer end of the shaft 88. The linkage is operable to translate linear movement of the actuator rod 84 to angular or rotational movement of the shaft 88 and, thus, the pointer 90. This translation is preferably amplified so that a small linear movement of the actuator rod 84 causes a relatively large rotational movement of the pointer 90. A calibration knob 92 is provided for calibrating the gauge 22, i.e., to locate the pointer 90 at a zero graduation for a given position of the actuator rod 84.

The gauge 22 is mounted to the base 12 by the mounting rod 78 and a locking mechanism 96. More specifically, the mounting rod 78 is inserted into the main bore of the mount 28 so as to be slidable therein between extended and retracted positions. The planar inner surface of the mounting rod 78 faces the locking mechanism 96. The locking mechanism 96 is operable to lock the mounting rod 78 in a fixed position within the main bore. The locking mechanism 96 includes a knurled knob 98 secured to a base cylinder 100 having a thread formed therein. An elongated contact rod 102 extends from the base cylinder 100 and is fixedly secured thereto. The contact rod 102 and at least a portion of the base 12 are disposed in the side bore. Threads of the base cylinder 100 are engaged with threads defining the outer portion of the side bore so as to threadably secure the locking mechanism 96 to the base 12. Rotation of the knob 98 in a tightening direction causes the threads of the base cylinder 100 to move along the threads of the side bore such that the base cylinder 100 and, thus, the contact rod 102, move laterally inward until a free end of the contact rod 102 is pressed against the planar inner surface of the mounting rod 78, which secures the mounting rod 78 in its current position and prevents further lateral movement of the contact rod 102. At this point, the locking mechanism 96 is in a locked mode. Rotation of the knob 98 in a loosening direction causes the threads of the base cylinder 100 to move along the threads of the side bore such that the base 12 and, thus, the contact rod 102, move laterally outward so as to move the free end of the contact rod 102 away from the mounting rod 78, which permits the mounting rod 78 to move within the main bore. At this point, the locking mechanism 96 is in a released mode.

The carrier structure 14 is disposed over the base 12 such that a bottom surface of the carrier structure 14 is supported on a top surface of the support structure 30 of the base 12 and such that the free end of the body portion 28b of the mount 28 is disposed between the first and second arms 46, 48 of the carrier structure 14. With the carrier structure 14 and the body portion 28b so positioned, the body of the center axle 66 of the first roller assembly 16 is threaded into the first mounting bore 42 in the body portion 28b of the mount 28, thereby positioning at least a majority of the roller 64 between the first and second arms 46, 48 of the carrier structure 14. An annular retaining washer 106 is preferably disposed around the body of the center axle 66 before the body is threaded into the first mounting bore 42. The retaining washer 106 has a diameter larger than the distance between the first and second arms 46, 48 and larger than the diameter of the roller 64. The retaining washer 106 includes a central opening, through which the body extends, and which has a diameter smaller than the diameter of the roller 64. In this manner, the retaining washer 106 is trapped between the roller 64 and the carrier structure 14. Since the diameter of the retaining washer 106 is larger than the distance between the first and second arms 46, 48 of the carrier structure 14, the carrier structure 14 is vertically trapped between the base 12 and the retaining washer 106, thereby preventing the carrier structure 14 from being separated from the base 12 in a vertical direction.

Since the roller 64 of the first roller assembly 16 has a diameter larger than the distance between the rollers 64 of the mounted second and third roller assemblies 18, 20, the rollers 64 of the second and third roller assemblies 18, 20 cannot be moved past the roller 64 of the first roller assembly 16 when the carrier structure 14 is moved toward the second end 30b of the support structure 30. Movement of the carrier structure 14 toward the first end 30a of the support structure 30 is limited by contact between the interior end surface of the bridge portion 50 and the free end of the body portion 28b of the mount 28. Thus, the carrier structure 14 is movable between a first position, wherein the interior end surface of the bridge portion 50 of the carrier structure 14 contacts the free end of the body portion 28b of the mount 28, and a second position, wherein the rollers 64 of the second and third roller assemblies 18, 20 contact the roller 64 of the first roller assembly 16. As can be appreciated, the foregoing restrictions in the movement of the carrier structure 14 prevents the carrier structure 14 from being separated from the base 12 in a horizontal direction.

With the carrier structure 14 mounted to the base 12 in the foregoing described manner, the outer end of the spring 58 is disposed against the free end of the body portion 28b of the mount 28. The spring 58 is at least partially compressed and biases the carrier structure 14 toward the second position. The set screw 62 may be threadably moved inwardly to increase the compression and, thus, the biasing force of the spring 58, or outwardly to reduce the compression and, thus, the biasing force of the spring 58.

The carrier structure 14 is movable by the lever assembly 24, which includes an elongated lever 110, a limit pin 112 and a contact device 114.

The lever 110 has an upper handle portion 116 and a lower mounting portion 118 with arcuate first and second protruding regions 118a, 118b. First and second holes 120, 122 are formed in the first and second protruding regions 118a, 118b, respectively.

The contact device 114 includes a hollow cylindrical roller 124 rotatably secured to a center axle 126, which includes a threaded body joined to a head. The contact device 114 is mounted to the mounting portion 118 of the lever 110. More specifically, the body of the center axle 126 extends through the second hole 122 of the mounting portion 118 and has a fastening nut 128 threaded thereto, on a side of the lever 110, opposite to the head of the center axle 126.

The limit pin 112 is disposed in the smooth bore 38 of the support structure 30 and extends laterally outward therefrom. The limit pin 112 is secured in the smooth bore 38, such as by a friction fit.

The lever 110 is pivotally mounted to the support structure 30 of the base 12 by a shoulder screw 130 having a body that extends through the first hole 120 in the mounting portion 118 and is threadably received in the threaded bore 40 of the support structure 30. The mounting portion 118 of the lever 110 is located between the limit pin 112 and the inward end surface 36 of the support structure 30. The lever 110 is pivotal between an actuated position and a neutral position to move the carrier structure 14 between the first and second positions. When the lever 110 is in the neutral position, the roller 124 of the contact device 114 rests against the limit pin 112, with the handle portion 116 of the lever 110 extending upwardly and rearwardly. When the handle portion 116 is moved forwardly by the hand of an operator, the lever 110 pivots from the neutral position toward the actuated position. As the lever 110 pivots forwardly, the roller 124 of the contact device 114 contacts the end surface 50a of the carrier structure 14 and applies a forwardly-directed force to the carrier structure 14, thereby causing the carrier structure to move toward the first position. When the carrier structure 14 reaches the first position, further pivotal movement of the lever 110 is prevented and the lever 110 is disposed in the actuated position. When the operator moves the lever 110 back to the neutral position and/or releases the handle portion 116, the bias of the spring 58 causes the carrier structure 14 to move back to the second position.

When the inspection device 10 is not holding an eccentric bushing, the inspection device 10 is in a neutral mode, wherein the carrier structure 14 is horizontally disposed in the second position, with the rollers 64 of the second and third roller assemblies 18, 20 in contact with the roller 64 of the first roller assembly 16. The contact element 86 is disposed against or proximate to the roller 64 of the first roller assembly 16 and the pointer 90 of the gauge 22 is located at the zero graduation.

The inspection device 10 is operable to inspect eccentric bushings, such as the eccentric bushing shown in FIG. 1, which is designated by the reference numeral 136. The eccentric bushing 136 has a cylindrical outer surface 138 and an inner surface 140 defining a cylindrical interior bore 142. The outer surface 138 defines a cylinder having an axis that is not coaxial with an axis of the interior bore 142. In other words, the axis of the interior bore 142 is offset from the axis of the outer surface 138.

The eccentric bushing 136 is loaded or inserted into the inspection device 10 by first moving the carrier structure 14 to the first position using the lever 110 and moving the contact element 86 away from the first roller assembly 16. The eccentric bushing 136 is then disposed over the first roller assembly 16 such that the roller 64 thereof is disposed against the inner surface 140 of the eccentric bushing 136. Once the eccentric bushing 136 is so disposed, the carrier structure 14 is allowed to move back toward the second position and the contact element 86 is allowed to move toward the first roller assembler 16. The presence of the eccentric bushing 136 maintains the contact element 86 and the second and third roller assemblies 18, 20 in outward positions (i.e., positions located toward the first end 30a of the support structure 30) relative to the positions they occupy when the inspective device 10 in the neutral mode.

With the eccentric bushing 136 positioned in the above-described manner, the eccentric bushing 136 is disposed between the first roller assembly 16 and the second and third roller assemblies 18, 20, as shown in FIG. 1. More specifically, the roller 64 of the first roller assembly 16 is disposed against the inner surface 140 of the eccentric bushing 136, while the rollers 64 of the second and third roller assemblies 18, 20 are disposed against the outer surface 138 of the eccentric bushing 136. The contact element 86 is disposed between the second and third roller assemblies 18, 20 and is pressed against the outer surface 138 of the eccentric bushing 136. The pointer 90 of the gauge 22 is located at a graduation having a value that provides a measure of the distance between the outer surface 138 and the inner surface 140 of the eccentric bushing 136 at the location of the contact element 86.

After the eccentric bushing 136 has been loaded into the inspection device 10 and is positioned as described above, the eccentric bushing 136 is rotated by hand. As the eccentric bushing 136 is rotated, the roller 64 of the first roller assembly 16 and the rollers 64 of the second and third roller assemblies 18, 20 maintain contact with the inner and outer surfaces 140, 138 of the eccentric bushing 136, respectfully, due to the biasing action of the spring 58. Similarly, the contact element 86 maintains contact with the outer surface 138 of the eccentric bushing 136 due to the biasing action of the gauge spring on the actuator rod 84. Since the rollers 64 are rotatable and may rotate along with the eccentric bushing 136, the frictional resistance between the rollers 64 and the eccentric bushing 136 is reduced. As the eccentric bushing 136 is rotated, the distance between the outer surface 138 and the inner surface 140 of the eccentric bushing 136 at the contact element 86 changes due to the offset between the axis of the interior bore 142 and the axis of the cylinder defined by the outer surface 138. This change in distance between the outer and inner surfaces 138, 140 moves the contact element 86, which, in turn, moves the pointer 90. More specifically, as the distance between the outer and inner surfaces 138, 140 increases, the readings of the pointer 90 increase, and as the distance between the outer and inner surfaces 138, 140 decreases, the readings of the pointer 90 decrease. In this manner, the highpoint of the eccentric bushing 136 may be determined by simply rotating the eccentric bushing 136 until the pointer 90 is positioned at a graduation having a maximum value (for a revolution of the eccentric bushing 136). When this reading occurs, the highpoint of the eccentric bushing 136 will be disposed against the contact element 86.

After the eccentric bushing 136 has been inspected, the eccentric bushing 136 is removed from the inspection device 10 by first moving the carrier structure 14 to the first position using the lever 110 and, while the carrier structure 14 is in the first position, removing the eccentric bushing 136 from between the first roller assembly 16 and the second and third roller assemblies 18, 20. Another eccentric bushing may then be inserted into the inspection device 10 for inspection. If the subsequent eccentric bushing has different dimensions than the eccentric bushing 136, the gauge 22 may be moved inward or outward, as required, to properly position the contact element 86 relative to the subsequent eccentric bushing. This movement of the gauge 22 is accomplished by first rotating the knob 98 to move the locking mechanism 96 to the released mode. An inward or outward force, as required, is applied to the housing 70, which causes the mounting rod 78 to slide through the main bore of the mount 28 and the housing 70 to move inward or outward, as the case may be, relative to the base 12. When the contact element 86 is properly positioned, the knob 98 is then rotated to move the locking mechanism 96 to the locked mode. The subsequent eccentric bushing may then be inserted into the inspection device 10 in the same manner as the eccentric bushing 136.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A device for inspecting an eccentric bushing having interior and exterior surfaces, said device comprising:

first, second and third holding devices;

a base to which the first holding device is mounted;

a carrier structure to which the second and third holding devices are mounted, said carrier structure being mounted to the base for movement relative to the base between a first position, wherein the second and third holding devices are disposed distal to the first holding device, and a second position, wherein the second and third holding devices are disposed proximate to the first holding device;

a spring disposed between the carrier structure and the base and operable to bias the carrier structure toward the second position;

a gauge mounted to the base and including a display and a movable contact element disposed between the second and third holding devices and biased toward the first holding device, said display being operatively connected to the contact element so as to provide a visual reading indicating the amount of movement of the contact element;

wherein the first, second and third holding devices and the contact element are positioned to allow the eccentric bushing to be placed in an inspection position, wherein the eccentric bushing is disposed between the first holding device and the second and third holding devices, such that the first holding device is disposed against the interior surface of the eccentric bushing and such that the contact element and the second and third holding devices are disposed against the exterior surface of the eccentric bushing, whereby rotation of the eccentric bushing moves the contact element, which causes the display to provide readings showing changes in the distance between the interior and exterior surfaces of the eccentric bushing as the eccentric bushing is rotated.

2. The device of claim 1, wherein the second and third holding devices each comprise a rotatable roller.

3. The device of claim 1, wherein the first holding device comprises a rotatable roller.

4. The device of claim 1, wherein the first, second and third holding devices each comprise a rotatable roller.

5. The device of claim 4, wherein the display comprises a pointer movable relative to graduated dial, and wherein the pointer is connected to the contact element by an elongated actuator rod.

6. The device of claim 4, wherein the rollers are cylindrical and are arranged in a triangular configuration.

7. The device of claim 4, wherein the gauge further comprises a housing to which the display is secured, and wherein the gauge is movably mounted to the base to permit the contact element to be moved to accommodate eccentric bushings of varying diameter.

8. The device of claim 7, wherein the gauge further comprises a mounting rod secured to the housing, at least a portion of said mounting rod being slidably received in an elongated bore formed in the base, thereby mounting the gauge to the base.

9. The device of claim 8, further comprising a locking mechanism for locking the mounting rod in a selected position within the elongated bore.

10. The device of claim 9, wherein the locking mechanism includes a contact rod that is at least partially disposed in a cross bore formed in the base and that intersects the elongated bore, said contact rod be movable to selectively engage and disengage the mounting rod.

11. The device of claim 1, wherein the carrier structure includes a pair of spaced-apart arms to which the second and third holding devices are mounted, and wherein the first holding device is disposed between the spaced-apart arms.

12. The device of claim 11, wherein the base includes a mount joined to a top surface of a support structure, and wherein the first holding device is mounted to the mount and the mount is disposed between the spaced-apart arms.

13. The device of claim 12 further comprising a lever assembly connected to the base and operable to move the carrier structure from the second position to the first position.

14. The device of claim 13, wherein the lever assembly comprises a lever pivotally connected to the base and a contact device connected to the lever, said contact device including a roller that contacts the carrier structure when the lever is pivoted toward an actuated position.

15. The device of claim 12, wherein the first, second and third holding devices each comprise a cylindrical roller that is rotatable around a center axis.

16. The device of claim 1, wherein the first, second and third holding devices each comprise a hollow cylindrical roller disposed around and rotatably secured to a center axle having a threaded body, wherein the bodies of the center axles for the second and third holding devices are threadably secured in threaded bores formed in the carrier structure, and wherein the body of the of the center axle for the first holding device is threadably secured in a threaded bore formed in the base.

17. A method of inspecting an eccentric bushing having interior and exterior surfaces, said method comprising the steps of (a.) providing first, second and third rollers having first, second and third central axes, respectively;

(b) providing a contact element;

(c.) holding the first roller such that the first roller is rotatable around the first central axis and such that the first central axis is fixed in position;

(d.) holding the second and third rollers such that the second and third rollers are rotatable around the second and third central axes, respectively, and such that the second and third central axes are fixed in position relative to each other, but are movable relative to the first central axis in a direction perpendicular to the first central axis, and such that the first, second and third central axes are arranged in a triangular configuration;

(e.) holding the contact element so as to be movable along a linear path extending between the second and third rollers;

(f.) positioning the eccentric bushing between the first roller and the second and third rollers, such that the first roller is disposed against the interior surface of the eccentric bushing and such that the contact element and the second and third rollers are disposed against the exterior surface of the eccentric bushing;

(g.) applying a biasing force to the second and third rollers that urges the second and third rollers toward the first roller;

(h.) applying a biasing force to the contact element that urges the contact element toward the first roller;

(i.) rotating the eccentric bushing while the eccentric bushing is disposed between the first roller and the second and third rollers, whereby rotation of the eccentric bushing moves the contact element; and (j.) measuring the movement of the contact element to provide a measure of the changes in distance between the interior and exterior surfaces of the eccentric bushing as the eccentric bushing is rotated.

18. The method of claim 17, wherein steps (c.) and (d.) are performed using a base to which the first roller is mounted for rotation and a carrier structure to which the second and third rollers are mounted for rotation, wherein said carrier structure is mounted to the base for movement relative to the base between a first position, wherein the second and third rollers are disposed distal to the first roller, and a second position, wherein the second and third rollers are disposed proximate to the first roller.

19. The method of claim 18, wherein step (g.) is performed using a spring disposed between the carrier structure and the base, wherein the spring is operable to bias the carrier structure toward the second position.

20. The method of claim 18, wherein step (f.) comprises the steps of:
 (k.) moving the second and third rollers away from the first roller;
 (l.) placing the eccentric bushing over the first roller; and
 (m.) moving the second and third rollers toward the first roller.

21. The method of claim 20, wherein step (k.) is performed using a lever that is pivotally connected to the base and has a contact device mounted thereto.

22. The method of claim 21, wherein in step (k), the lever is pivoted toward the first roller so that the contact device contacts the carrier structure and moves the carrier structure to the first position.

23. The method of claim 17, wherein steps (g.) and (h.) are performed during the performance of step (i.).

24. The method of claim 23, wherein steps (c.), (d.) and (e.) are also performed during the performance of step (i.).

* * * * *

UNITED STATES PATENT AND TRADEMARK OFFICE
CERTIFICATE OF CORRECTION

PATENT NO. : 6,901,676 B1
DATED : June 7, 2005
INVENTOR(S) : Macke

It is certified that error appears in the above-identified patent and that said Letters Patent is hereby corrected as shown below:

<u>Title page,</u>
Item [57], ABSTRACT,
Line 6, delete "fixable" and insert -- fixed --.

Signed and Sealed this

Twenty-third Day of August, 2005

JON W. DUDAS
*Director of the United States Patent and Trademark Office*